(12) United States Patent
Idestrup

(10) Patent No.: US 7,579,063 B2
(45) Date of Patent: Aug. 25, 2009

(54) FABRIC REINFORCED MULTI-PLY PLYWOOD PANEL

(76) Inventor: Peer Falko Idestrup, c/o Auror Forest Products Inc., 30 Allaura Blvd., Aurora, Ontario (CA) L4G 3S5

( * ) Notice: Subject to any disclaimer, the term of this patent is extended or adjusted under 35 U.S.C. 154(b) by 302 days.

(21) Appl. No.: 11/641,847

(22) Filed: Dec. 20, 2006

(65) Prior Publication Data
US 2008/0152862 A1    Jun. 26, 2008

(30) Foreign Application Priority Data
Dec. 12, 2006  (CA) .................................. 2570930

(51) Int. Cl.
*B32B 21/04* (2006.01)
*B32B 21/10* (2006.01)
*B32B 21/14* (2006.01)

(52) U.S. Cl. ....................... 428/106; 428/535

(58) Field of Classification Search ............... 442/32, 442/38, 45, 46, 47, 58, 181, 325, 413; 428/106, 428/535, 537.1, 479.6
See application file for complete search history.

(56) References Cited
U.S. PATENT DOCUMENTS
6,033,754 A * 3/2000 Cooke ..................... 428/106
* cited by examiner

*Primary Examiner*—Alexander Thomas

(57) ABSTRACT

A bendable multi-ply plywood panel includes at least two rotary cut veneer layers oriented with their grain structures substantially transverse to the bending direction of the panel, and which are secured respectively on each side of a flexible Nylon or cotton mesh layer by an adhesive. The rotary-cut veneer construct is in turn adhered to a rear side of the facing veneer construct which has a select hardwood or softwood veneer face ply. The facing veneer construct is formed so that the grain structure of the face ply is arranged with its grain orientation aligned in a longitudinal orientation parallel to both the longitudinal length of the panel and its bending direction.

24 Claims, 3 Drawing Sheets

FABRIC REINFORCED MULTI-PLY PLYWOOD PANEL

SCOPE OF THE INVENTION

The present invention relates to a fibre or fabric reinforced plywood panel, and more particularly a bendable multi-ply plywood panel which is constructed so as to be readily bent without producing significant checks or cracks in the face ply of the panel.

BACKGROUND OF THE INVENTION

Bendable plywood sheets are known for use in furniture construction, as well as in architectural applications where a curved or rounded wooden surface is desired. Conventional bendable plywood is a 3-ply construction using a thin high density hardwood inner core ply with two thick low density outer plies of fast growth rotary cut veneer.

FIG. 1 shows a conventional bendable plywood panel 10 which typically is manufactured and sold in standard size rectangular sheets having a 1.25 meters (4 feet) length of grain and a width of 2.5 meters (8 feet) across the grain. The panel 10 is constructed so as to enable it to be bent in a bending direction $B_D$ parallel to its longitudinal elongated length, without requiring the pre-application of heat or moisture, and without producing a significant degree of checking, cracking or splintering in the face ply panel layer.

To provide the panel 10 with its bending properties, FIG. 2 shows best the panel 10 as having a three-ply construction. The panel includes outer ply or layers 12,14 of 4.25 mm thick fuma veneers which are adhesively bonded to respective sides of a 0.7 mm thick birch or hardwood core veneer 16 by layers of an adhesive 18a,18b. As shown best in FIG. 1, to enable bending of the panel 10 in the bending direction $B_D$, each of the veneer layers 12 and 14 is formed from a low density wood rotary-cut veneer, with the core ply 16 being comparably thin. The veneers 12,14 and 16 are then laminated together with the grain directions $G_D$ of the layers 12,14 elongated in the same direction, and oriented parallel to the lateral width of the panel 10 and at right angles of that of the layer 12.

A disadvantage exists with conventional bendable plywood panels 10 in that to prevent cracking of the veneer layers 12,14 heretofore such panels have been formed with a thickness of less than about 0.9 cm. It has been found that where thicker plywood panels have been provided, the veneer layers 12,14 are susceptible to cracking, checking or splintering. As a result, where thicker plywood panels are desired, heretofore it has been necessary to individually bend, position and adhere together multiple panels, increasing both product manufacturing difficulties, and expense.

Conventional prior art bendable plywood panels suffer a further disadvantage in that the use of rotary-cut veneer layers 12,14 as the outer facing surfaces of the panel 10 typically provide an aesthetically displeasing appearance. In particular, rotary-cut veneer layers often present a roughened or deeply pitted wood grain, making the veneer layers 12,14 of the panel 10 unsuitable for direct finishing by staining or painting. As a result, architects or furniture manufacturers typically will finish the article or architectural component by subsequently applying a further hardwood veneer layer, such as cherry, oak or the like to the surface of the bent plywood once it has been preformed. As a result, following initial fabrication of the furniture or architectural component, it is thereafter necessary to then apply to the panel 10 a select or finished grade veneer such as an oak or cherry veneer over one or both of the bent fuma veneers 12,14, to achieve the desired look. In addition to increasing manufacturing time, the necessity of separately applying finishing veneers increases the chance of workmanship defects, as well as production costs.

SUMMARY OF THE INVENTION

To overcome at least some of the disadvantages associated with prior art bendable plywood panels, the present invention provides a multi-ply plywood panel which includes at least two rotary-cut veneer layers which are bonded on either side of a flexible mesh layer, on and/or through which has been applied or interspersed an adhesive. The rotary-cut veneer layers are preferably provided with their respective grain structure orientation aligned, allowing the panel to be bent or rolled in a direction generally transverse to the direction of elongation of their wood grain structure orientation. The mesh layer may be formed of either synthetic or natural materials, including without restriction a molded plastic or Nylon mesh, as well as natural and synthetic woven fibres or fabrics.

Another object of the invention is to provide a bendable plywood panel which includes a veneer face ply layer or side, in the form of a finished or select hardwood or softwood species.

Another object of the invention is to provide a multi-ply plywood panel which is constructed so as to be readily bendable without significant cracking or checking of at least one face-ply layer, and without the necessity of pre-applying heat and/or moisture, and which is suitable for use in the manufacture of architectural components or furniture.

Another object of the invention is to provide a standard size bendable plywood panel which has a minimum thickness of at least about 0.4 cm, preferably at least 0.5 cm, and more preferably between about 0.6 cm and 1.5 cm, and which may be bent with a maximum bend radius of about 1.5 meters, preferably 1 meter and most preferably, 0.5 meters, without substantial cracking, checking or splintering of the face veneer layer of the panel.

Another object of the invention is to provide a rectangular bendable plywood panel having a substantially standard longitudinal length of about 2.5 meters and a width of about 1.3 meters, and which includes a multi-ply decorative face veneer construct which provides the panel with a finished or stain-grade veneer face side or ply which has a longitudinally oriented grain structure which runs parallel to the bending direction of the panel.

In one embodiment, the present invention comprises a bendable multi-ply plywood panel which preferably is rectangular in shape having a longitudinal length selected at between about 2 and 4 meters, and most preferably about 2.5 meters, and a lateral width of between about 1.8 meters, and preferably about 1.25 meters. The panel typically has a minimum thickness selected of at least 0.5 cm, and more preferably between about 0.6 and 1.5 cm, however, it is envisioned that thinner or thicker panels may also be provided.

In a most simplified construction, the panel is formed with a multi-layer veneer construct which includes at least two rotary-cut veneer layers. The rotary-cut veneer layers are each oriented with their grain structures substantially transverse to the roll or bending direction of the panel. The rotary-cut veneer layers may, for example, be formed from fuma or other suitable woods and have a thickness of between about 1 to 7 mm, and preferably about 2 to 6 mm. The rotary-cut veneer layers are secured respectively on each side of a flexible mesh layer by an adhesive which is either applied to one or both sides of the mesh, and/or interspersed therein. Suitable adhesives would include heat and/or time settable adhesives, such as those formed from polyvinyl chloride (PVC) and/or polyvinyl acetate (PVA). It is to be appreciated that other adhesives which resist cracking or failure under flexure may also, however, be used. The mesh layer may, for example, consist of a plastic or Nylon fabric mesh layer or alternately a cotton fabric such as cheese-cloth. Preferably the mesh layer is selected having a maximum thickness of less than about 0.8 mm and more preferably between about 0.2 to 0.5 mm.

Although not essential, the rotary-cut veneer/mesh construct is preferably provided as a backing construct which is adhered to a rear side of a facing or decorative face veneer construct which presents a finished veneer face surface or side. More preferably, the facing veneer construct has a finished or select hardwood or softwood veneer face ply which is of a paint or stain grade quality. The finished outer or decorative face veneer ply is preferably chosen to provide a high quality finished wood grain appearance. Most preferably, the decorative face veneer ply is formed from one of a quarter sliced veneer or rotary cut veneer, a lengthwise sliced veneer, a plane sliced veneer or a rift cut veneer. Suitable hardwood and softwood veneers for use as the decorative face ply include, without restriction, veneers made from oak, cherry, pine, poplar, mahogany or other hardwood or softwood species. Although not essential, the facing veneer construct is preferably formed so that the grain structure of the decorative face ply is arranged with its grain orientation aligned in a longitudinal orientation which is parallel to both the longitudinal length of the panel and the bending or roll direction of the panel, and perpendicular to the grain structure orientation of the rotary-cut veneer layers of the backing veneer construct. It is to be appreciated, however, that in an alternate embodiment, the outer face ply of the facing veneer construct could be provided with its grain structure oriented parallel to that of the rotary-cut veneer layers.

The facing veneer construct is optimally formed having a total thickness of less than about 2.5 mm, and more preferably less than about 1.5 mm. The final thickness dimension of the facing veneer construct is selected so as to avoid significant cracking or checking of its decorative face ply as the plywood panel is bent or rolled in the bending direction $B_D$. The facing veneer construct may include a single finished or decorative outer veneer ply or layer only. More preferably, however, the facing veneer construct includes at least two and more preferably three 0.3 to 1.5 mm thick veneer layers and more preferably 0.6 to 1 mm thick veneer layers which are bonded together by suitable PVC or PVA adhesive layers.

Accordingly, in one aspect the present invention resides in a generally rectangular bendable plywood panel including,
   a facing veneer construct having a decorative or finished veneer face side with a longitudinally oriented grain structure, and
   a backing veneer construct adhered to a back side of the facing veneer construct, the backing veneer construct including,
      a first rotary-cut veneer layer having a grain structure orientation substantially transverse to the grain structure orientation of the face side,
      a second rotary-cut veneer layer having a grain structure orientation substantially transverse to the grain structure orientation of the face side, each of the first and second rotary-cut veneer layers being bendable in a direction generally transverse to their respective grain structure orientations,
      a flexible mesh layer interposed between said first rotary-cut veneer layer and said second rotary-cut veneer layers, and
      an adhesive interspersed in said mesh layer and securing said first rotary-cut layer and said second rotary-cut layer relative to each other,
   and wherein said facing veneer construct has a thickness selected at less than about 2.1 mm wherein bending of the first and second rotary-cut veneer layers effects bending of the facing veneer construct in the direction of the grain structure orientation of the decorative face side.

In another aspect, the present invention resides in a preformed bendable plywood panel having a thickness selected at between about 0.6 and 2.4 cm, and preferably 1.5 to 2.2 cm, said panel including,
   a decorative or facing veneer construct presenting a finished or decorative veneer face side having a longitudinally oriented grain structure, said facing veneer construct including a finished or decorative outer face veneer layer and an inner veneer layer, the face veneer layer having a longitudinally elongated grain orientation and a thickness of less than about 1.5 mm and preferably less than 0.6 mm,
   a backing veneer construct adhered to a backing side of the facing veneer construct, the backing veneer construct including,
      a first rotary-cut veneer layer having a laterally oriented grain structure,
      a second rotary-cut veneer layer having a grain structure orientation substantially corresponding to the grain structure orientation of the first rotary-cut veneer, whereby each of the first and second rotary-cut veneer layers being bendable in a direction generally transverse to their respective grain structure orientations,
      a flexible mesh layer interposed between said first rotary-cut veneer layer and said second rotary-cut veneer layers,
      an adhesive selected from a PVC adhesive and a PVA adhesive being interspersed in said mesh layer and securing said first rotary-cut layer and said second rotary-cut layer relative to each other,
   and wherein said facing veneer construct is bendable in the longitudinal direction and has a maximum thickness selected at less than about 2 mm.

In a further aspect, the present invention resides in a generally rectangular multi-ply plywood panel having a longitudinal length of between about 2 and 4 meters, and a lateral width of between about 1 and 2 meters including,
   a facing veneer construct including an outer decorative face veneer layer having a longitudinally oriented grain structure aligned in the longitudinal direction of the panel, and an inner veneer layer, said facing veneer construct having a maximum thickness selected at less than about 2 mm,
   a backing veneer construct adhered to a back side of the facing veneer construct, the backing veneer construct including,
      a first rotary-cut fuma veneer layer having a grain structure orientation substantially aligned in the transverse direction of the panel,
      a second rotary-cut fuma veneer layer having a grain structure orientation substantially aligned in the transverse direction of the panel wherein each of the first and second rotary-cut veneer layers being bendable in the direction of the outer face grain structure orientation,
      a flexible mesh layer interposed between said first rotary-cut veneer layer and said second rotary-cut veneer layers, and an adhesive interspersed in said mesh layer and securing said first rotary-cut layer and said second rotary-cut layer relative to each other.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
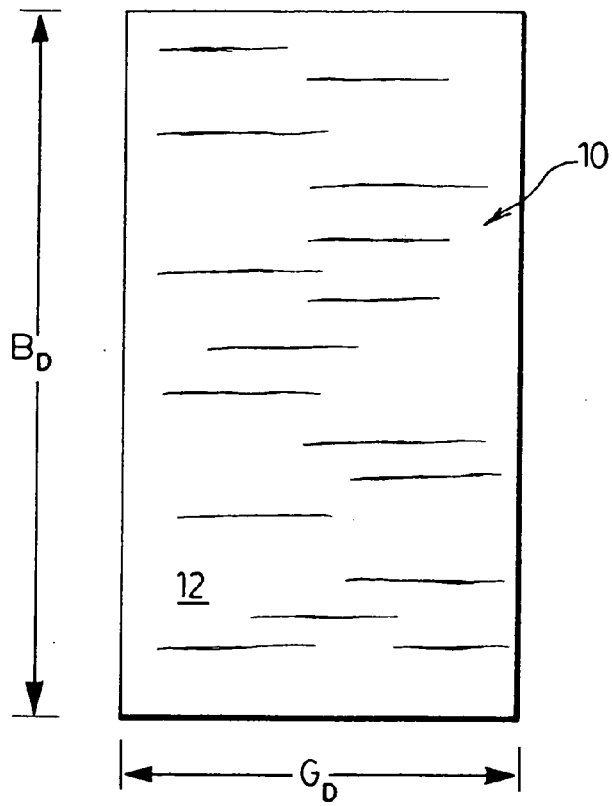
FIG. 1 illustrates a perspective plan view of the face side of a conventional bendable plywood panel.
Figure 2:
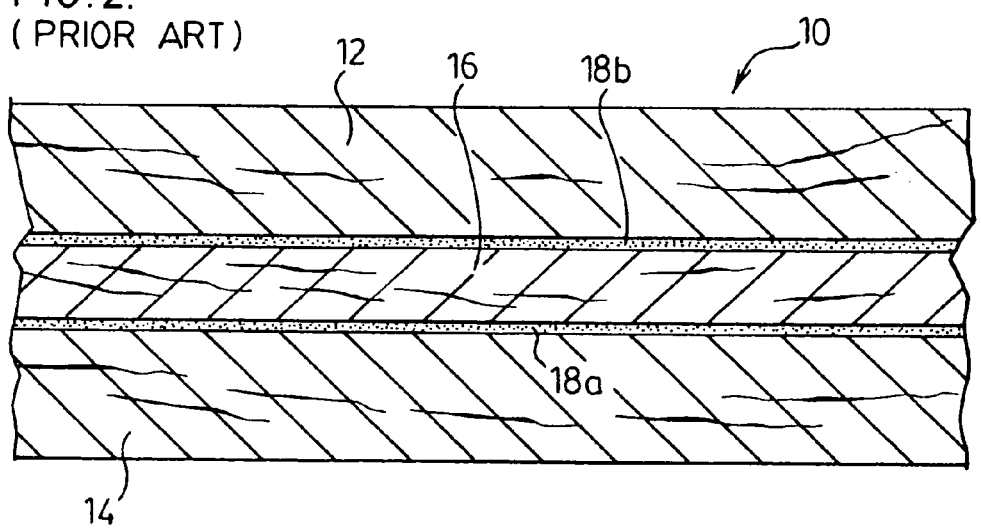
FIG. 2 illustrates a partial cross-sectional view of the panel shown in FIG. 1.
Figure 3:
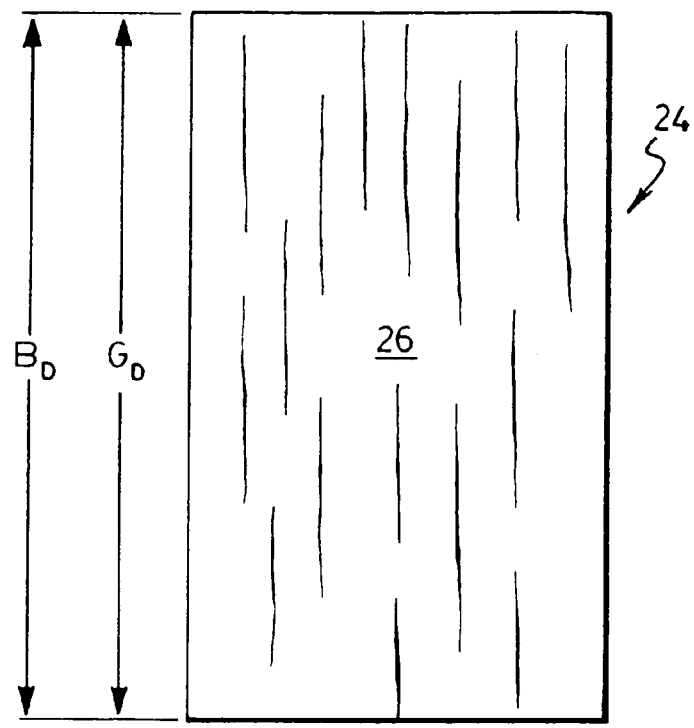
FIG. 3 illustrates a perspective plan view of the decorative face side of a bendable plywood panel in accordance with the present invention.
Figure 4:
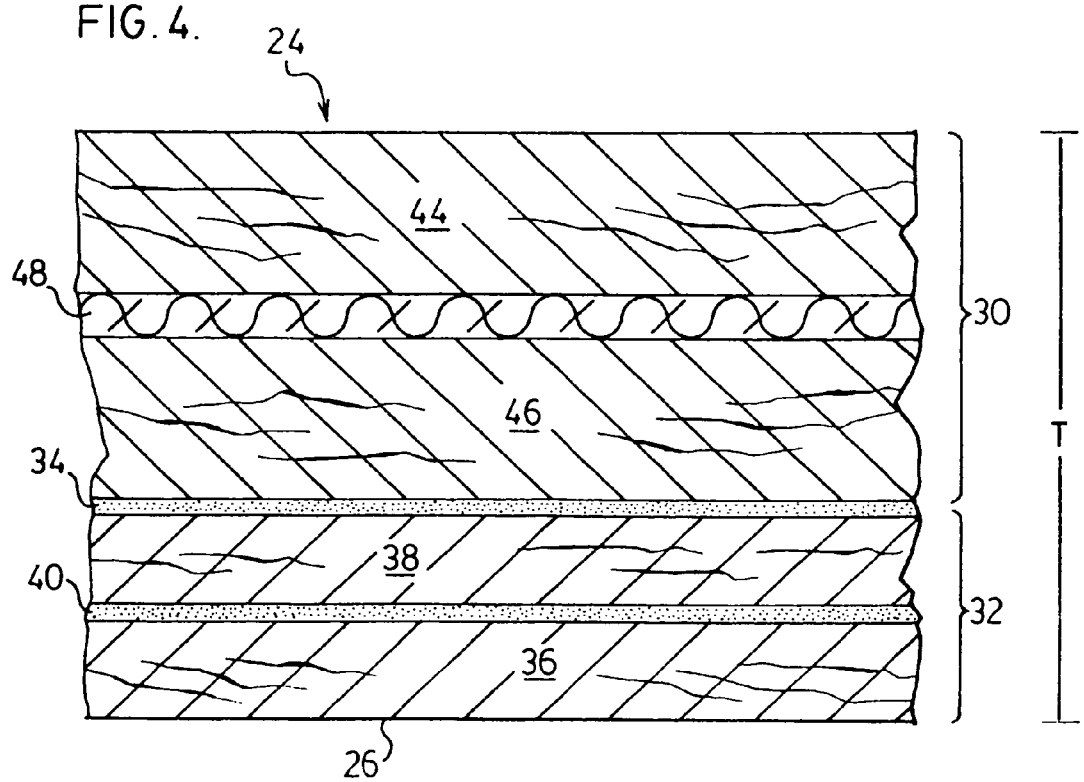
FIG. 4 illustrates a partial cross-sectional view of the panel shown in FIG. 3.

FIGS. 3 and 4 show best a five-ply bendable plywood panel 24 in accordance with a preferred embodiment of the invention. As will be described, the panel 24 is preferably formed and sold as a conventional standard 2.5 meter by 1.25 meter rectangular sheet. The panel 24 is bendable in a bending direction $B_D$ which is parallel to its longitudinal length, without requiring the application of heat and/or moisture, and without significant cracking, checking or splintering of at least the outermost face side 26 of the panel 24. As will be described, the overall thicknesses of the various ply layers provide the panel 24 with an overall thickness T of between about 0.6 and 1.5 cm.

FIG. 4 shows best the panel 24 as including a backing veneer construct 30 and a decorative or facing veneer construct 32. The backing veneer construct 30 is bonded to the rear surface of the facing veneer construct 32 by an adhesive layer 34 of time and/or thermal settable PVC or PVA glue. The facing veneer construct 32 is provided with an outermost finished or decorative grade wood veneer ply 36, as well as an inner veneer ply 38 which is bonded directly to the veneer construct 30. In use, the decorative veneer ply 36 forms the face side 26 of the panel 24. The veneer ply 36 is formed from a hardwood or softwood veneer having a thickness of less than about 0.7 mm, and more preferably about 0.3 to 0.5 mm. Suitable hardwood and softwoods for use as the veneer ply 36 would include, without restriction, rotary cut, quarter sliced, lengthwise sliced, plain sliced or rift-cut veneers made of pine, poplar, cherry or oak species.

Most preferably, the inner veneer ply 38 is formed as a hardwood ply having a thickness of less than about 0.7 mm, and more preferably between about 0.3 and 0.5 mm and which is selected to allow bending of the facing veneer construct 32 with the remainder of the panel 24. The rearward face of the outer decorative veneer ply 36 is bonded to the inner veneer ply 38 by an adhesive layer 40 of thermal and/or time settable PVC or PVA glue. As shown best in FIG. 3, each of the veneer plies 36,38 are bonded to each other with the direction of elongation of their respective grain structures oriented parallel to each other, and in a grain direction $G_D$ oriented aligned with the bending direction $B_D$ of the panel 24.

The backing veneer construct 30 is shown best in FIG. 4 as having in a most simplified construction, a pair of rotary-cut veneer ply layers 44,46. Each of the veneer ply layers 44,46 are chosen from bendable low density wood veneers, such as fuma wood veneer and have a thickness of between about 1 and 7 mm, and more preferably between about 2 and 5 mm. The veneer layers 44,46 are positioned with their grain structure orientation parallel to each other, and substantially transverse to both the direction of elongation of the panel 24 and the grain orientation of the outer veneer ply 36. The rotary-cut veneer ply layers 44,46 are bonded on each lateral side of a flexible mesh layer 48. The mesh layer 48 is formed from a layer of woven cotton cheese-cloth which is interspersed on one side with a PVA or PVC adhesive in an amount selected to fully penetrate the mesh layer 48 to achieve adequate bonding of veneer ply layers 44,46 thereto. The mesh layer 48 has a preferred maximum thickness of less than about 0.5 mm and preferably about 0.1 mm, however, thicker or thinner mesh material may also be used.

The overall thickness of the various ply layers 36,38,44, 46,48 is preferably chosen to provide the panel 24 with a minimum thickness selected at between about 0.5 and 1.5 cm and most preferably about 1 cm, while providing the panel 24 with a bend radius in the bending direction $B_D$ of between about 1.5 and 0.3 meters, preferably less than 1 meter, and more preferably about 0.5 meters. The applicant has appreciated that by the inclusion of the flexible mesh layer or ply 48 between the rotary-cut veneer ply layers 44,46, the panel 24 possesses increased flexibility, while resisting cracking. Furthermore, by adhering a decorative or facing veneer construct 32 which includes hardwood or softwood plies 36,38 to only one side of the backing veneer construct 30, it is possible to provide a panel 24 which is bendable and which includes a high quality decorative face surface 26. As such, the panel 24 may advantageously be used in furniture and/or architectural applications to provide a stain grade surface 26 without necessitating the separate step of applying a desired hardwood veneer after the formation of a form for a finished article or architectural component. In addition, the applicant has appreciated that the substitution of a comparatively thinner flexible mesh layer 48 in place of a hardwood core ply 16, the backing veneer construct 30 may be made comparatively thicker, enabling the panel 24 to be formed with a greater thickness while still possessing suitable bending properties.

In addition to providing a bendable panel 24 having a finished or decorative face side 26 which in turn simplifies construction of furniture or other articles, the comparably increased thickness T of the panel 24 enables its use in applications where thicker plywood sheets are required for structural integrity, without necessitating the additional time consuming step of attaching separate panels together.

Figure 5:
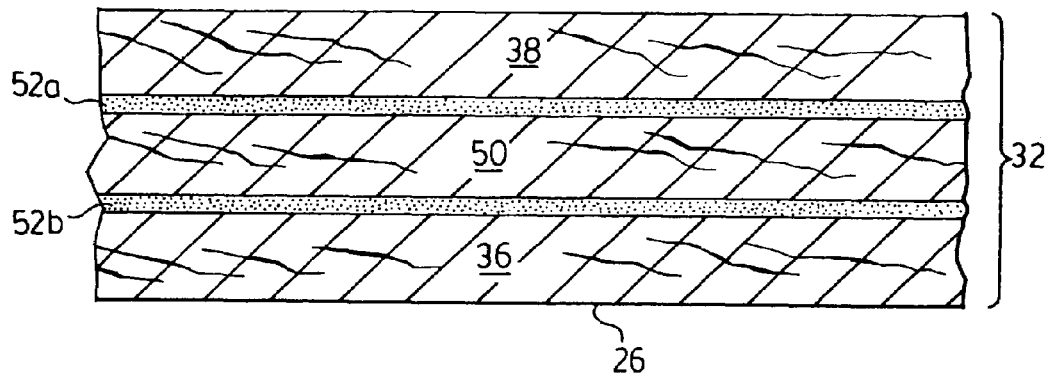
FIG. 5 illustrates a partial cross-sectional view of a facing veneer construct for use in the panel of FIG. 3 in accordance with another embodiment of the invention.

Although FIG. 4 illustrates the decorative facing veneer construct 32 as being formed as a two-ply layer, the invention is not so limited. FIG. 5 illustrates a facing veneer construct 32 for use with the panel 24 in accordance with an alternate embodiment, and wherein like reference numerals are used to identify like components. In FIG. 5, the decorative veneer construct 32 includes a core ply layer 50 which is bonded in position between the outer decorative veneer face ply 36 and the inner veneer ply 38. The core ply 50 is bonded respectively, to the inner and outer plies 36,38 by PVC or PVA adhesive layers 52a,52b. Most preferably, the core ply 50 is formed as a hardwood veneer ply having a thickness of between about 0.3 to 0.5 mm. The core ply 50 may be provided with its grain orientation either parallel to, or transverse to the grain orientation of the outer and inner plies 36,38.

Figure 6:
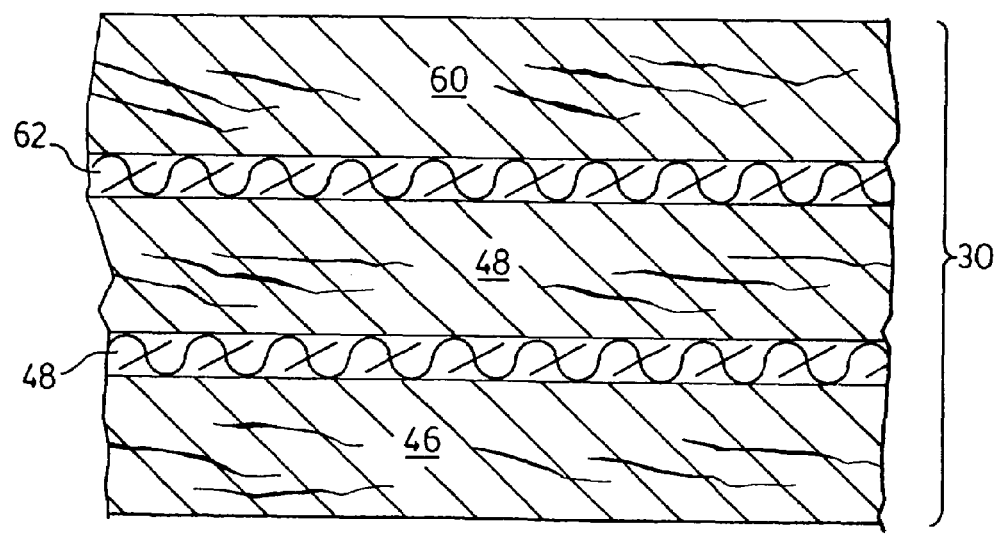
FIG. 6 illustrates a partial cross-sectional view of a backing veneer construct for use in the panel of FIG. 3 in accordance with a further preferred embodiment.

Similarly, while FIG. 4 illustrates the backing veneer construct 30 as including a single mesh layer 48 interposed between two rotary-cut veneer layers 44,46, the invention is not so limited. Reference may be had to FIG. 6 which illustrates an alternate backing veneer construct 30. The construct 30 of FIG. 6 may be used either on its own, or in conjunction with the facing veneer construct 32 in accordance with an alternate embodiment, and wherein like reference numerals are used to identify like components. FIG. 6 shows the backing veneer construct 30 as having a five-ply construction which includes three rotary-cut veneer layers 44,46,60. Each of the rotary-cut veneer layers 46,48,60 preferably comprises a fuma veneer layer having a thickness of between about 2 and 7 mm. Interposed between each of the veneer layers 46,48 and 48,60 is respectively a flexible mesh layer 48,62. As with the embodiment described with reference to FIGS. 3 and 4, PVC or PVA adhesive is provided in a sufficient amount to fully penetrate through the mesh layers 48,62 to achieve bonding of each of the veneer ply layers 46,48 and 48,60 on each side of the mesh layers 48,62, respectively. Each of the veneer ply layers 46,48,60 are secured in place with their grain structure orientations being arranged parallel to each other, and oriented transverse to the bending direction $B_D$ of the panel.

It is to be appreciated that the backing veneer construct of FIG. 6 advantageously permits the formation of still thicker plywood panels 24 having a thickness up to about 2.2 cm while still enabling the panel 24 to be rolled or bent in the bending direction $B_D$.

Although FIG. 3 illustrates a panel 24 wherein both the grain orientation of the outer ply 36 and panel bending $B_D$ occur in the longitudinal direction of panel elongation, the invention is not so limited. It is to be appreciated that the panel 24 could be constructed with each of the grain orientations of the respective veneer plies 36,38,44 and 46 in a 90° orientation to that which is shown, thereby allowing the panel 24 to be rolled bent in its lateral direction.

Although the applicant has found that the inclusion of the flexible mesh layer 48 between rotary-cut fuma veneer layers 44,46 advantageously permits the panel 24 to remain bendable and made with a comparatively increased thickness T, it is to be appreciated that other rotary-cut veneers may also be used, including without limitation obeeche balsa, as well as other woods.

Although the preferred embodiment of the invention describes the mesh layer 48 as comprising a cotton cheesecloth mesh, the invention is not so limited. It is to be appreciated that other mesh flexible mesh and/or fibre reinforcing materials may be used in the present invention, including, without restriction, Nylon mesh sheets, or other woven or unwoven fibre materials. Similarly, while the preferred embodiment of the invention describes the use of PVC or PVA glues, other adhesives which remain flexible when cured may also be used, without departing from the spirit and scope of the invention.

Although the detailed description describes and illustrates preferred embodiments, the invention is not so limited. Many modifications and variations will now occur to persons skilled in the art. For a definition of the invention, reference may be had to the appended claims.

I claim:

1. A generally rectangular bendable plywood panel including,
a facing veneer construct having a decorative veneer face side with a longitudinally oriented grain structure, and
a backing veneer construct adhered to a back side of the facing veneer construct, the backing veneer construct including,
a first rotary-cut veneer layer having a grain structure orientation substantially transverse to the grain structure orientation of the face side,
a second rotary-cut veneer layer having a grain structure orientation substantially transverse to the grain structure orientation of the face side, each of the first and second rotary-cut veneer layers being bendable in a direction generally transverse to their respective grain structure orientations,
a flexible mesh layer interposed between said first rotary-cut veneer layer and said second rotary-cut veneer layers, and
an adhesive interspersed in said mesh layer and securing said first rotary-cut layer and said second rotary-cut layer relative to each other,
and wherein said facing veneer construct has a thickness selected at less than about 2.1 mm wherein bending of the first and second rotary-cut veneer layers effects bending of the facing veneer construct in the direction of the grain structure orientation of the face side.

2. The plywood panel as claimed in claim 1 wherein said adhesive comprises a PVC or PVA adhesive.

3. The plywood panel as claimed in claim 1 wherein said mesh layer is selected from the group consisting of a molded plastic mesh layer, a woven fabric layer, and a cotton cheesecloth layer.

4. The plywood panel as claimed in claim 3 wherein the panel has a bend radius of less than about 0.5 meters in the direction of the grain structure orientation of the outer face veneers.

5. The plywood panel as claimed in claim 4 further including adhesive layer bonding the facing veneer construct to said backing veneer construct, and wherein said panel has a minimum thickness selected at between about 0.5 and 1.5 cm.

6. The plywood panel as claimed in claim 1 wherein said facing veneer construct comprises a decorative outer veneer layer and an inner veneer layer, both the outer and inner veneer layers having a longitudinally elongated grain orientation and a thickness of less than about 0.6 mm,
the outer veneer layer being selected from the group consisting of a quarter sliced veneer, a lengthwise sliced veneer, a plain sliced veneer, and a rift cut veneer,
a first adhesive layer interposed between and bonding the inner and outer veneer layers.

7. The plywood panel as claimed in claim 6 further including a second adhesive layer interposed between and bonding the inner veneer layer and the backing veneer construct.

8. The plywood panel as claimed in claim 7 wherein each of the first and second adhesive layers comprise a time settable or thermo settable adhesive selected from the group consisting of a PVA adhesive and a PVC adhesive.

9. The plywood panel as claimed in claim 1 wherein said panel is elongated in the longitudinal direction of the grain structure of the face side.

10. The plywood panel as claimed in claim 9 wherein said panel is a preformed panel having a longitudinal length selected at between about 2.2 and 4 meters, and a lateral width selected at between about 1 and 1.8 meters.

11. The plywood panel as claimed in claim 1 further including a third rotary-cut veneer layer having a grain structure orientation substantially transverse to the grain structure orientation of the face side, the third rotary-cut veneer layer being bendable in a direction generally transverse to its grain structure orientation, a second further flexible mesh layer interposed between said second rotary-cut veneer layer and said third rotary-cut veneer layers, and adhesive interspersed in said second further mesh layer securing said third rotary-cut layer and said second rotary-cut layer relative to each other.

12. A preformed bendable plywood panel having a thickness selected at between about 0.6 and 2.2 cm, said panel including,
    a facing veneer construct presenting a finished veneer face side having a longitudinally oriented grain structure, said facing veneer construct including a finished outer face veneer layer and an inner veneer layer, the face veneer layer having a longitudinally elongated grain orientation,
    a backing veneer construct adhered to a backing side of the facing veneer construct, the backing veneer construct including,
        a first rotary-cut veneer layer having a laterally oriented grain structure,
        a second rotary-cut veneer layer having a grain structure orientation substantially corresponding to the grain structure orientation of the first rotary-cut veneer, whereby each of the first and second rotary-cut veneer layers being bendable in a direction generally transverse to their respective grain structure orientations,
        a flexible mesh layer interposed between said first rotary-cut veneer layer and said second rotary-cut veneer layers,
        an adhesive selected from a PVC adhesive and a PVA adhesive being interspersed in said mesh layer and securing said first rotary-cut layer and said second rotary-cut layer relative to each other,
    and wherein said facing veneer construct is bendable in the longitudinal direction and has a maximum thickness selected at less than about 2 mm.

13. The plywood panel as claimed in claim 12 wherein said adhesive comprises a flexible PVC or PVA adhesive.

14. The plywood panel as claimed in claim 13 wherein each of said first and second rotary-cut veneer layers comprise a fuma veneer having a maximum thickness selected at less than about 6 mm.

15. The plywood panel as claimed in claim 14 further including a third rotary-cut veneer layer having a grain structure orientation substantially transverse to the grain structure orientation of the face side, the third rotary-cut veneer layer being bendable in a direction generally transverse to its grain structure orientation,
    a second further flexible mesh layer interposed between said second rotary-cut veneer layer and said third rotary-cut veneer layers, and adhesive interspersed in said second further mesh layer securing said third rotary-cut layer and said second rotary-cut layer relative to each other.

16. The plywood panel as claimed in claim 13 wherein the facing veneer construct further includes an intermediate core veneer layer interposed between the face veneer layer and the inner veneer layer, and
    a plurality of adhesive layers bonding respectively to the face veneer layer and the core veneer layer, and the core veneer layer and the inner veneer layer.

17. The plywood panel as claimed in claim 12, wherein said mesh layer has a maximum thickness selected at less than about 0.2 mm and is selected from the group consisting of a synthetic fiber mesh layer, a plastic mesh layer and a cotton cheese-cloth layer.

18. The plywood panel as claimed in claim 12 wherein said panel is elongated in a direction transverse to the direction of the grain structure of the face side, and has a longitudinal length selected at between about 2.2 and 4 meters, and a lateral width selected at between about 1 and 2 meters.

19. The plywood panel as claimed in claim 12 wherein said panel is elongated in a direction parallel to the direction of the grain structure of the face side, and has a longitudinal length selected at between about 2.2 and 4 meters, and a lateral width selected at between about 1 and 2 meters.

20. A generally rectangular multi-ply plywood panel having a longitudinal length of between about 2 and 4 meters, and a lateral width of between about 1 and 2 meters including,
    a facing veneer construct including an outer face veneer layer having a longitudinally oriented grain structure aligned in the longitudinal direction of the panel, and an inner veneer layer, said facing veneer construct having a maximum thickness selected at less than about 2 mm,
    a backing veneer construct adhered to a back side of the facing veneer construct, the backing veneer construct including,
        a first rotary-cut fuma veneer layer having a grain structure orientation substantially aligned in the transverse direction of the panel,
        a second rotary-cut fuma veneer layer having a grain structure orientation substantially aligned in the transverse direction of the panel wherein each of the first and second rotary-cut veneer layers being bendable in the direction of the outer face grain structure orientation,
        a flexible mesh layer interposed between said first rotary-cut veneer layer and said second rotary-cut veneer layers, and
        an adhesive interspersed in said mesh layer and securing said first rotary-cut layer and said second rotary-cut layer relative to each other.

21. The multi-ply plywood panel as claimed in claim 20 wherein said adhesive comprises a PVC or PVA adhesive, and said mesh layer is selected from the group consisting of a molded plastic mesh and a cotton cheese-cloth.

22. The multi-ply plywood panel as claimed in claim 21 wherein each of the fuma veneer layers having a thickness selected at between about 2 mm and 5 mm.

23. The multi-ply plywood panel as claimed in claim 22 wherein the panel has a bend radius of less than about 0.5 meters in the direction of the grain structure orientation of the outer face veneers.

24. The multi-ply plywood panel as claimed in claim 21 wherein said panel has a minimum thickness of at least about 0.6 cm, and with the face veneer layer comprising a decorative outer wood veneer layer, each of the decorative outer veneer layer and inner veneer layer having a thickness of less than about 1.5 mm,
    a first adhesive layer interposed between and bonding the inner and outer veneer layers, and
    a second adhesive layer interposed between the inner veneer layer and the backing veneer construct.

* * * * *